US006979253B2

United States Patent
Thyssen

(10) Patent No.: US 6,979,253 B2
(45) Date of Patent: Dec. 27, 2005

(54) WORK DRIVE FOR CONTINUOUS GENERATION GEAR GRINDING MACHINE

(75) Inventor: Wolfgang Thyssen, Walisellen (CH)

(73) Assignee: Reishauer AG, Wallisllen (CH)

( * ) Notice: Subject to any disclaimer, the term of this patent is extended or adjusted under 35 U.S.C. 154(b) by 381 days.

(21) Appl. No.: 10/147,032

(22) Filed: May 17, 2002

(65) Prior Publication Data

US 2002/0182990 A1 Dec. 5, 2002

(30) Foreign Application Priority Data

May 17, 2001 (DE) .......................................... 101 24 305

(51) Int. Cl.$^7$ .............................................. B25B 5/00
(52) U.S. Cl. ........................ 451/147; 451/246; 451/253
(58) Field of Search ................ 451/48, 47, 242, 451/246, 147, 219, 253, 275, 249, 10, 11

(56) References Cited

U.S. PATENT DOCUMENTS

| 3,750,272 | A | * | 8/1973 | Gomond | .................. | 451/42 |
| 5,119,594 | A | * | 6/1992 | Riha | ...................... | 451/48 |
| 6,491,568 | B1 | * | 12/2002 | Jankowski | .................. | 451/5 |
| 6,575,812 | B2 | * | 6/2003 | Wirz | ........................ | 451/9 |

FOREIGN PATENT DOCUMENTS

DE  23 46 530 A1  3/1975

OTHER PUBLICATIONS

Taiz, Moskau, "Typische Fehler der Zahnradbearbeitung (Teil I)", *Fertigungstechnik Und Betrieb*. vol. 17, No. 3, (Mar. 1967), pp. 180–187. In German.

Weck, Manfred, *Werkzeugmaschinen–Fertigungssysteme: Messtechnische Untersuchungs und Beureteilung*. VDI Vertag; Düsseldorf, Bd. 45 Aufl., (1966), pp. 360–363. In German

* cited by examiner

*Primary Examiner*—Hadi Shakeri
(74) *Attorney, Agent, or Firm*—Browdy and Neimark, P.L.L.C.

(57) ABSTRACT

The gear train of a work drive system on a machine for the continuous grinding of gears, with which by means of non-integer transmission ratio between work spindle (3) and drive motor (4) as well as a high number of teeth on the cylindrical gear (6) on the work spindle (3), high integer transverse and face contact ratio of the gear train, and a damping ring (7) on the work spindle (3), tonal disturbances of the workpiece incorporated in the gear unit are avoided.

12 Claims, 2 Drawing Sheets

WORK DRIVE FOR CONTINUOUS GENERATION GEAR GRINDING MACHINE

TECHNICAL FIELD

The invention concerns the constructional design of a grinding machine for the continuous generation grinding of a gear, in particular of a the work drive of such a machine.

BACKGROUND OF THE INVENTION

On account of the steadily increased production out and manufacturing accuracy evolving in the course of technical development, and the growing demands on performance and quality especially of automobile gear drives, such machines are being employed more and more in industrial gear manufacture for grinding the flanks of pre-cut, hardened gear teeth. The most important aims targeted here are a high load carrying capacity of the tooth flanks in the interest of a compact weight and space saving gear unit design, and an optimum running smoothness, i.e. a minimum noise emission from the gear unit. Both demand a highly accurate observation of the desired flank form.

In continuous generation grinding the grinding worm and the teeth of the gear to be ground are in mutual generative engagement, wherein the workpiece is rotated strictly synchronous to the continuous rotation of the grinding worm at a speed ratio of the number of starts on the grinding worm to the number of teeth on the workpiece. Any deviation from this synchronism leads to form deviations of the workpiece flanks, and thereby impairs the workpiece quality.

One of the sources of synchronism deviation in the rotations of the grinding worm and workpiece which is difficult to control is the non-uniform running of the workpiece during grinding, caused by the tooth engagement of the driving pinion with the cylindrical gear on the work spindle, and the torque pulsation of the work drive motor. In the case of the tooth mesh disturbance, this results in a periodic rotational angular deviation of the workpiece teeth of an order related to the number of teeth on the work spindle gear, and in the case of the motor pulsation in a periodic rotational angular deviation of the workpiece teeth of an order related to the motor pulsation multiplied by the ratio of the numbers of teeth on the work spindle gear and the pinion.

Noise investigations with assembled gear units have shown that in the case of an integer transmission ratio between motor and work spindle, both orders of disturbance are clearly audible as tones in the noise level of the gear unit, both on the test stand and in the installed state in the vehicle, the frequencies of the two tones corresponding exactly with the order related to the tooth engagement of the work spindle gear and that of the pulsation of the spindle drive motor. This effect is still present even with the minimum possible motor pulsation and scarcely measurable rotational angular error of the work spindle gear, and requires for its elimination a costly re-machining of the workpiece teeth by lapping or honing in an additional machining operation, thus substantially increasing the manufacturing expense.

TAIZ, B. A, "Typical Errors in Gear Machining (part I)", in "Fertigungstechnik und Betrieb", $17^{th}$ year, H.3, March 1967, pp. 180–187, recognizes that cyclic errors in the grinding worm produce an undulation on the tooth surface of the gear being machined. A proposal for a remedy is not given however.

In DE 23 46 530 a suggestion is made to provide an idler as primary gear, in order to improve the pitch accuracy.

SUMMARY OF THE INVENTION

The objective of the present invention is to introduce a grinding machine for continuous grinding of a gear having a work spindle drive with a work spindle gear, wherein the disturbance factors of motor pulsation and/or tooth engagement of the work spindle gear are no longer discernible as tonal disturbance in the vehicle in the installed state even without re-machining of the workpiece.

The task is solved by a grinding machine for continuous grinding of a gear, the grinding machine comprising a grinding worm for grinding a workpiece and a work spindle drive, wherein said work spindle drive comprises a drive motor, a pinion being connected to the drive motor, a work spindle with a work spindle axis for said workpiece and a cylindrical work spindle gear rigidly connected to said work spindle and being driven by said pinion, wherein said pinion and said cylindrical work spindle gear have a transmission ratio i being approximately the sum of $\pm\Delta i$ and R, wherein R is an integer transmission ratio and $$\Delta i = \frac{s_{min}}{B * P}$$

where:
$s_{min}$ a lower feedrate limit of a feed motion Z of said grinding worm parallel to said work spindle axis during finish grinding in mm per revolution of said work spindle,
B a maximum width of said workpiece to be ground in mm, and
P a number of torque disturbance periods of said drive motor per motor revolution.

BRIEF DESCRIPTION OF THE DRAWINGS

In the following the invention is described in detail by the example of a single stage work spindle drive system on a gear grinding machine for the continuous generating of gears driven by a DC motor, referring to FIGS. 1 and 2.

DETAILED DESCRIPTION OF THE PREFERRED EMBODIMENT

Figure 1:
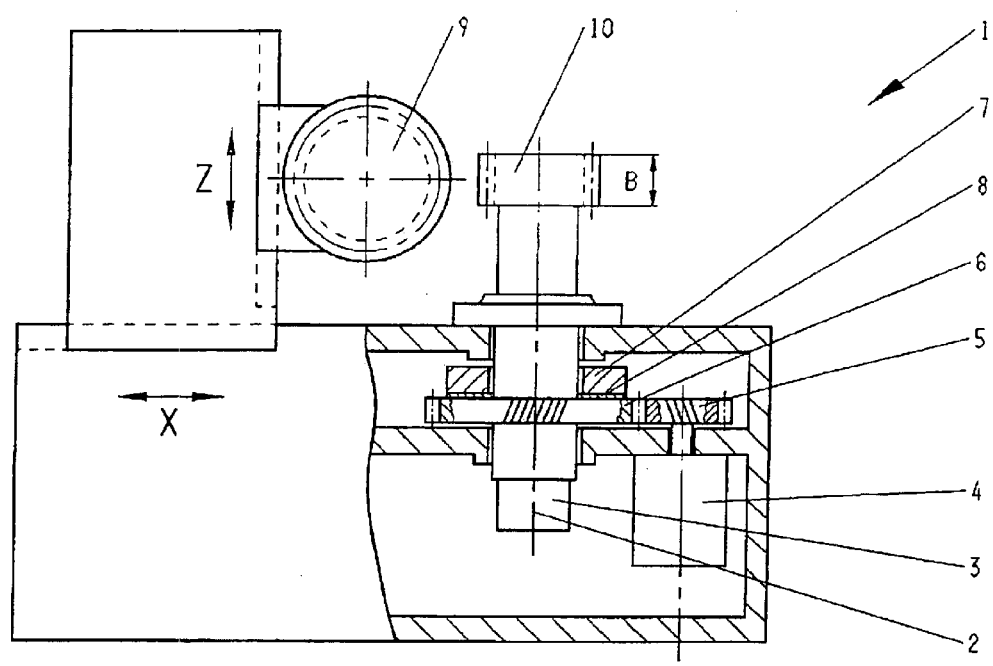
FIG. 1 shows a gear grinding machine with a work spindle drive 1 diagrammatically according a first embodiment of the invention and FIG. 2 shows a gear grinding machine according a second embodiment of the invention.

The work spindle 3, located for rotation about its axis 2, is driven synchronous to the rotation of the grinding worm 9 by the spindle drive motor 4 via the driving pinion 5 and the cylindrical work spindle gear 6 on the work spindle 3.

In combating the tonal disturbances due to the pulsation of the drive motor 4, the invention exploits the recognized fact that periodic rotational angular deviations of the work spindle 3 during the grinding of the gear 10 caused by fault sources in the machine only lead to acoustically discernible gear tooth error on the workpiece 10 when their frequency is an integer multiple of the rotary frequency of the work spindle 3. According to the invention, this is avoided by selecting the transmission ratio between the driving pinion 5 and the work spindle gear 6 such that the rotary oscillations induced in the work spindle 3 by the motor pulsation is never of equal phase at any time during the grinding operation. This requirement is fulfilled when the transmission ratio i between pinion 5 and work spindle gear 6 is an amount $$\Delta i = \frac{s_{min}}{B*P}$$

larger or smaller than the nearest integer transmission ratio desired from the aspect of machine design, here called R. This means: $i = R \pm \Delta i$.

Herein:

$s_{min}$ the lower feedrate limit of the feed motion Z of the grinding worm parallel to the work spindle axis 2 during finish grinding in mm per revolution of the workpiece and therefore the work spindle 3, B the maximum width of the workpiece 10 to be ground in mm P the number of torque disturbance periods of the drive motor 4 per motor revolution.

By this measure the motor pulsation is rendered totally ineffectual as tonal disturbance when the ground gear 10 is in mesh with another gear in a gear unit, i.e. of a vehicle.

In the case of the tooth mesh pulsation of the driven work spindle gear 6 on the work spindle 3, this effect of ineffectiveness as tonal disturbance is only attainable with high speed gears, in that the number of teeth on the work spindle gear 6 is made so high that disturbance frequencies in the gear unit of the vehicle deriving from the order of disturbance related to the work spindle gear 6 and the noise-critical speeds of workpiece when being a gear 10 in said gear unit of the vehicle exceed the perception threshold of about 16 kHz of the human ear. Since according to pertinent investigations the critical disturbance situations arise precisely at gear speeds of above 3500 rpm, a number of teeth of more than 250, for example, on the work spindle gear 6 presents for serious cases an effective means of avoiding a tone disturbance in the vehicle.

To also minimize the gear tone disturbance caused by the tooth engagement of the work spindle gear 6 when the gear units are operating at low speed levels of less than 3500 rpm, at which due to the low exciter frequency the rotational oscillatory accelerations and hence torque amplitudes are smaller, tests have shown that alongside a careful highly precise grinding of the work spindle gear 6, an integer transverse and face contact ratio of 2, and in extreme cases a frictional damper on the work spindle are effective measures. This concerns a gyrating body in the form of a metal damping ring 7 resting on the gear 6 the damping ring 7 being centered and guided by the latter for rotation about the axis 2, and provided with a slip layer 8 on its contact surface. The damping effect results from the frictional energy absorbing relative rotation between the work spindle gear 6 and the damping ring 7 on the occurrence of rotational oscillations in the work spindle gear 6, which the damping ring 7 is unable to follow due to its inertia. The friction characteristics of the slip layer 8 ensure that the coefficient of sliding friction between the work spindle gear 6 and the damping ring 7 is always greater than the coefficient of the static friction.

Figure 2:
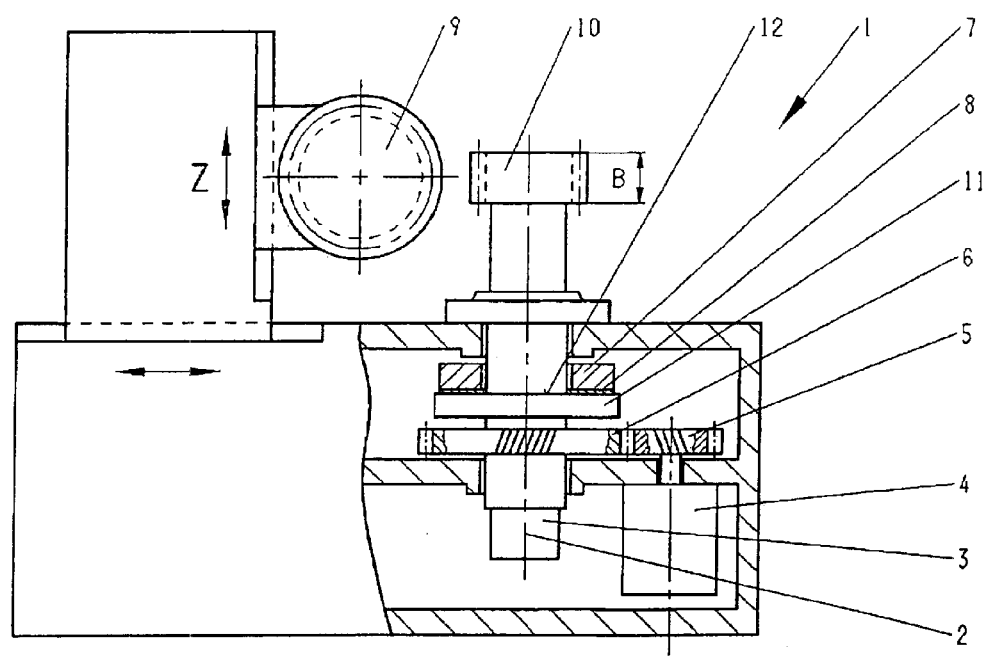

In a second embodiment of the invention, shown in FIG 2, a rotary body 11 with an end face 12 is attached rigidly to the work spindle 3 and the gyrating body in the form of the damning ring 7 is located coaxially for rotation on the work spindle 3 and lies via the slip layer 8 on the end face 12.

The slip layer 8 is pre-tensioned against the end face 12 by gravitation of the gyrating body 7 and/or by spring pressure. The coefficient of sliding friction of the slip layer 8 is preferably greater than the coefficient of static friction.

What is claimed is:

1. A grinding machine for continuous grinding of a gear, the grinding machine comprising a grinding worm for grinding a workpiece and a work spindle drive, wherein said work spindle drive comprises a drive motor, a pinion being connected to the drive motor, a work spindle with a work spindle axis for said workpiece and a cylindrical work spindle gear rigidly connected to said work spindle and being driven by said pinion, wherein said pinion and said cylindrical work spindle gear have a transmission ratio i being approximately the sum of $\pm \Delta i$ and R, wherein R is an integer transmission ratio and $$\Delta i = \frac{s_{min}}{B*P}$$

where:

$s_{min}$ a lower feedrate limit of a feed motion Z of said grinding worm parallel to said work spindle axis during finish grinding in mm per revolution of said work spindle, B a maximum width of said workpiece to be ground in mm, and P a number of torque disturbance periods of said drive motor per motor revolution.

2. The grinding machine according to claim 1, wherein said cylindrical work spindle gear is a helical gear with at least 250 teeth.

3. The grinding machine according to claim 1, wherein said cylindrical work spindle gear has a transverse and face contact ratio being at least approximately an integer number, the number being at least 2.

4. The grinding machine according to claim 1, wherein a rotary body with an end face is attached rigidly to said work spindle, and a gyrating body is located coaxially for rotation on said work spindle and lies via a slip layer on said end face.

5. The grinding machine according to claim 4, wherein said slip layer is pre-tensioned against said end face by the gravitation of said gyrating body or by spring pressure.

6. The grinding machine according to claim 4, wherein said slip layer is pre-tensioned against said end face by the gravitation of said gyrating body and by spring pressure.

7. The grinding machine according to claim 4, wherein a coefficient of sliding friction between said slip layer and said rotary body is greater than a coefficient of static friction between them.

8. The grinding machine according to claim 4, wherein said slip layer is pretensioned against said end face by the graviation of that rotary body or by spring pressure.

9. The grinding machine according to claim 1, wherein a gyrating body is resting on said work spindle gear, the gyrating body being centered and guided by said work spindle gear for rotation about said work spindle axis wherein the gyrating body is provided with a slip layer.

10. The grinding machine according to claim 9, wherein the slip layer is pretensioned against said work spindle gear by the gravitation of that gyrating body or by spring pressure.

11. The grinding machine according to claim 9, wherein the coefficient of sliding friction between said and said work spindle gear is greater than the coefficient of static friction between them.

12. A work spindle drive for a grinding machine for continuous generation grinding of gears, said work spindle drive comprising:

a drive motor, a pinion connected to said drive motor, a work spindle with a work spindle axis for said workpiece and cylindrical work spindle gear rigidly connected to said work spindle and driven by said pinion, said pinion and said cylindrical work spindle gear having a transmission ratio i approximately equal to a sum of ±Δi and R, wherein R is an integer transmission ratio and $$\Delta i = \frac{S_{\min}}{B*P},$$

wherein $S_{min}$ is a lower feedrate limit of a feed motion Z of said grinding worm parallel to said work spindle axis during finish grinding in mm per revolution of said work spindle, B is a maximum width of said workpiece to be ground in mm, and P is a number of torque disturbance periods of said drive motor per motor revolution.

* * * * *